United States Patent [19]

Fowler

[11] Patent Number: 4,578,190

[45] Date of Patent: * Mar. 25, 1986

[54] FLUID DISTRIBUTION SYSTEM FOR SEPARATION MODULES

[75] Inventor: James D. Fowler, St. Louis, Mo.

[73] Assignee: Monsanto Company, St. Louis, Mo.

[*] Notice: The portion of the term of this patent subsequent to Jan. 21, 2003 has been disclaimed.

[21] Appl. No.: 665,411

[22] Filed: Oct. 26, 1984

[51] Int. Cl.⁴ .............................................. B01D 13/00
[52] U.S. Cl. ............................. 210/321.1; 210/433.2; 210/323.2
[58] Field of Search .......................... 55/16, 158, 159; 210/321.1–321.5, 433.2, 500.2, 456, 323.2

[56] References Cited

U.S. PATENT DOCUMENTS

| | | | |
|---|---|---|---|
| 3,277,959 | 10/1966 | Withers | 165/159 |
| 3,422,002 | 5/1966 | Geary et al. | 29/150 |
| 3,832,830 | 9/1974 | Gerow | 55/158 |
| 4,031,012 | 6/1977 | Gics | 55/158 X |
| 4,152,093 | 5/1979 | Germain | 55/158 X |
| 4,219,426 | 8/1980 | Spekle et al. | 210/232 |
| 4,378,981 | 4/1983 | Otstot et al. | 55/158 |
| 4,380,460 | 4/1983 | Otstot et al. | 55/158 |

Primary Examiner—Charles Hart
Attorney, Agent, or Firm—R. L. Broad, Jr.

[57] ABSTRACT

A fluid distribution system for a fluid separation module having a bundle of hollow fiber membranes positioned in a cylindrical shell and extending through a tube sheet positioned in an enlarged end portion of the shell, the enlarged end portion of the shell having therein an inlet opening for a fluid mixture, wherein a first sleeve attached to the tube sheet and surrounding the bundle of fibers extends into a second sleeve spaced from the tube sheet and having a larger diameter than the first sleeve such that a fluid mixture entering the inlet opening flows radially between the tube sheet and the second sleeve and then axially between the first and second sleeve. A third sleeve is spaced from the first sleeve to provide a path therebetween for the axially flowing fluid mixture to enter the bundle of fibers at an oblique angle and in a direction away from the tube sheet. A fourth cylindrical sleeve made from a porous fabric extends from the first sleeve to the third sleeve, the fourth sleeve having a diameter less than the diameter of the second sleeve to hold the hollow fiber membranes out of contact with said second sleeve.

6 Claims, 1 Drawing Figure

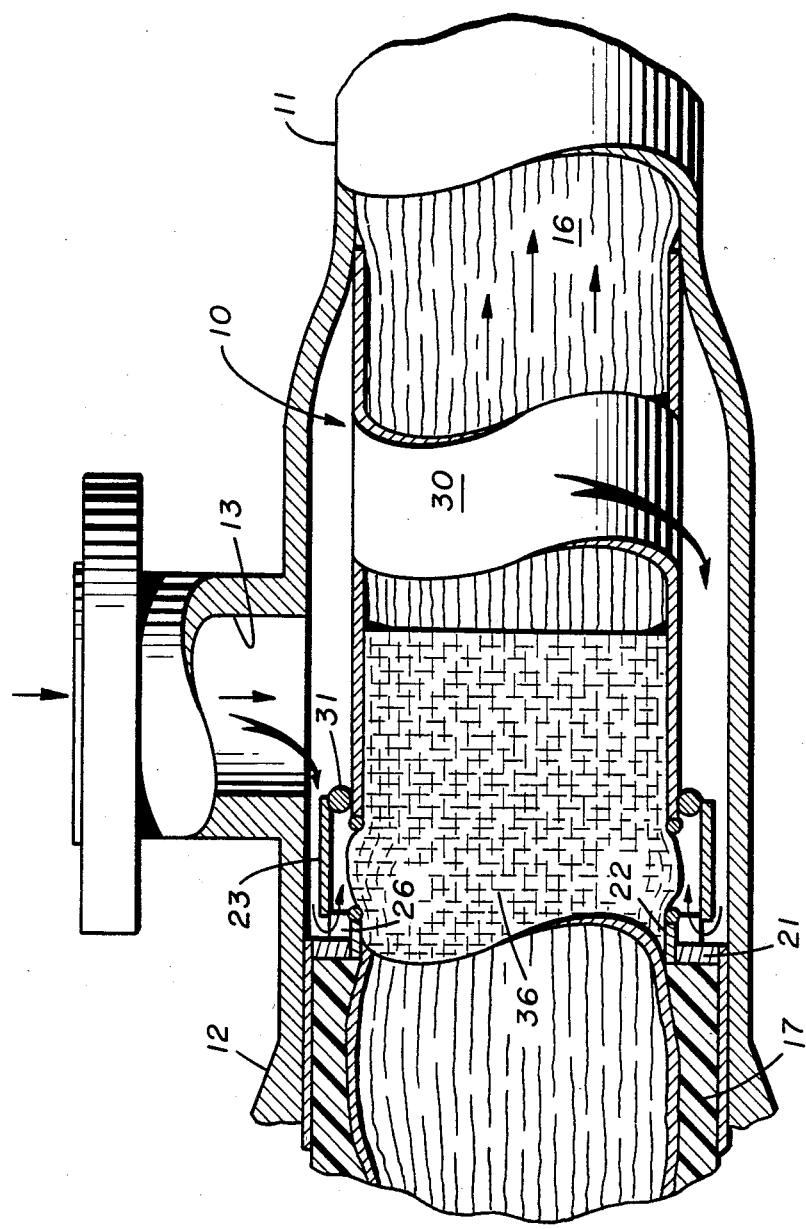

4,578,190

FLUID DISTRIBUTION SYSTEM FOR SEPARATION MODULES

BACKGROUND OF THE INVENTION

A. Field of the Invention

This invention relates to fluid distribution systems for fluid separation modules.

B. Prior Art

In one type of fluid separation apparatus, a bundle of membranes in the form of hollow fibers is potted in a resinous tube sheet, the resinous tube sheet being made from an epoxy or other material which is allowed to cure to a solid state. The potting of the fiber bundle in the tube sheet is carried out by placing the end of the fiber bundle in a mold and then pouring in a casting resin to fill the mold and the spaces between the fibers making up the bundle. Because of the fact that some of the casting resin wicks along the fibers and the fact that those portions of the fibers adjacent to the tube sheet are subjected to the heat generated in the exothermic curing of the tube sheet, the hollow fiber membranes tend to be most fragile at points in close proximity to the face from the tube sheet of which the fibers extend.

U.S. Pat. Nos. 4,378,981 and 4,380,460 disclose fluid separation modules having a fluid distribution system intended to reduce the erosion of fibers in a bundle of hollow fiber membranes by controlling the entrance of the fluid into the fiber bundle. A major disadvantage of these distribution systems is that the fluid is permitted to enter the fiber bundle in a radial direction with respect to the bundle such that the velocity of the fluid transverse to the hollow fiber membranes is at a maximum.

U.S. Pat. No. 3,339,341 is one of several patents which disclose the use of a fabric sleeve surrounding a bundle of hollow filaments used as membranes for separating fluids. The primary purpose of the fabric sleeve is to compact the fiber bundle when tension is applied to the sleeve so as to make the assembly of the bundle in a cylindrical shell easier. The diameter of the sleeve is such that the fiber bundle is in contact with the shell in normal operation.

U.S. Pat. No. 3,526,001 discloses a bundle of hollow fiber membranes encased in a fabric sleeve which is put under tension to compact the fiber bundle for insertion into a shell. The diameter of the sleeve is such that the bundle of fibers expands to fill the shell under operating conditions.

SUMMARY OF THE INVENTION

A fluid distribution system for a fluid separation module having a bundle of hollow fiber membranes positioned in a cylindrical shell and extending through a tube sheet positioned in an enlarged end portion of the shell, the enlarged end portion of the shell having therein an inlet opening for a fluid mixture, wherein a first sleeve attached to the tube sheet and surrounding the bundle of fibers extends into a second sleeve spaced from the tube sheet and having a larger diameter than the first sleeve such that a fluid mixture entering the inlet opening flows radially between the tube sheet and the second sleeve and then axially between the first and second sleeve. A third sleeve is spaced from the first sleeve to provide a path therebetween for the axially flowing fluid mixture to enter the bundle of fibers at an oblique angle and in a direction away from the tube sheet. A fourth cylindrical sleeve made from a porous fabric extends from the first sleeve to the third sleeve, the fourth sleeve having a diameter less than the diameter of the second sleeve to hold the hollow fiber membranes out of contact with said second sleeve.

DESCRIPTION OF THE DRAWING

The single FIGURE of the drawing shows the fluid distribution system of this invention.

DETAILED DESCRIPTION OF THE INVENTION

Referring now in detail to the drawing, there is shown a fluid separation module 10 housed in a cylindrical shell 11 having an enlarged end portion 12 which is provided with an inlet opening 13 for the admission of the fluid mixture into the shell 11. A bundle of hollow fiber membranes 16 is positioned in the shell 11 and extends through a tube sheet 17 positioned in the enlarged end portion 12 of the shell 11.

The tube sheet 17 is made from a resinous material such as an epoxy resin and is made by orienting the fiber bundle 16 in a vertical position and positioning the lower end of the fiber bundle in an appropriate mold (not shown) and then pouring into the mold a liquid casting resin. After the casting resin has cured, the tube sheet is removed from the mold and the end remote to the fiber bundle 16 is severed to expose the bores of the fibers making up the bundle 16.

A fluid mixture to be separated is fed into the inlet 13 to contact the outer surfaces of the hollow fiber membranes under a pressure greater than the pressure in the bores of the hollow fibers. One component of the fluid mixture permeates the hollow fiber membranes to a greater extent than the other components of the mixture, such that this component passes through the fibers walls to the bores thereof and then flows along these bores through the tube sheet 17 and is collected. Nonpermeated components of the fluid mixture travel down the shell 11 in the direction shown by arrows and is withdrawn from the shell at the remote end thereof. Appropriate seals (not shown) are provided to prevent leakage of the gas mixture around the periphery of the tube sheet 17.

A ring 21 secured to the tube sheet 17 supports a first cylindrical sleeve 22 which encloses a fiber bundle 16 and extends away from the tube sheet 17 as shown in the drawing. A second generally cylindrical sleeve 23, having a larger diameter than the first sleeve 22, is spaced from the tube sheet 17 to provide an annular passageway through which the fluid mixture may pass toward the first sleeve 22 in a radial direction with respect to the fiber bundle 16. The second sleeve 23 is secured to the first sleeve 22 by a plurality of spacers 26 to which the sleeves are welded, the spacers being spaced at intervals around the peripheries of the first and second sleeves 22 and 23, respectively.

The difference in diameter between the second sleeve 23 and the first sleeve 22 is such that the fluid mixture flowing radially between the second sleeve 23 and the tube sheet 17 will then flow in an axial direction between the sleeves 22 and 23.

A third sleeve 30, having substantially the same diameter as the first sleeve 22 surrounds the fiber bundle 16 and is secured to the second sleeve 23 by means of a ring 31 which is welded to both the second sleeve 23 and the third sleeve 30. The third sleeve 30 is spaced from the first sleeve 22 to provide an annular passageway for admission of the fluid mixture into the fiber bundle. This allows the fluid mixture to flow into the fiber bundle at an oblique angle with respect to the fiber bundle and in a direction away from the tube sheet.

In operation, a fluid mixture made up of two or more components is fed through the inlet opening 13 into the shell 11. This fluid mixture passes radially through the space between the tube sheet and the second sleeve 23 and axially between the sleeve 22 and 23 to then flow through the space between the first sleeve 22 and the third sleeve 30 into the fiber bundle 16 in a direction away from the tube sheet and at an oblique angle and in a direction away from the tube sheet.

The cross-sectional area of the annular opening defined by the end of the tube sheet and the second sleeve 23 is maintained at a low value to force the fluid mixture to circulate around the fiber bundle and enter at a uniform rate around the fiber bundle. If the opening between the tube sheet and the sleeve 23 were too large most of the fluid would flow into the fiber bundle at a point nearest the inlet opening 13 with very little flowing into the fiber bundle on the other side thereof. Thus, the cross-sectional area of the radial passageway between the tube sheet and the second sleeve 23 is smaller than the cross-sectional area of the axial passageway defined by the first sleeve 22 and the second sleeve 23 to further reduce the velocity of the fluid entering the fiber bundle.

The cross-sectional area of the annular passageway between the ends of the first sleeve 22 and the third sleeve 30 is at least three times as great as the cross-sectional area of the passageway between the first sleeve 22 and second sleeve 23.

The above described apparatus is disclosed and claimed in copending application Ser. No. 655,424 filed Oct. 26, 1984 in the name of Charles J. Runkle for "FLUID DISTRIBUTION SYSTEM FOR SEPARATION MODULE".

A fabric sleeve 36 surrounding the end of the bundle of hollow fibers 16 placed in this position prior to forming the tube sheet, so that the tube sheet is cast into the tube sheet. The sleeve 36 extends along the fiber bundle 16 into the third sleeve 30 so that it covers the opening between the first and third sleeves 23 and 30, respectively.

The diameter of the fabric sleeve is less than the diameter of the second sleeve so that the exposed fibers between the first sleeve 22 and the third sleeve 30 are held out of contact with the second sleeve 23. By "out of contact" we mean that the fabric sleeve 36 itself does not contact the second sleeve 23. This restricts the movement of the exposed fibers so that, when a gas mixture enters the module at a high velocity, the moving gas stream cannot break the fibers by moving them back and forth.

The fabric sleeve 36 is preferably made from a monofilament in such a way that the fabric is in the form of a mesh. The monofilament is preferably made from a polymeric material, but may be made from a metal.

I claim:

1. A fluid distribution system for a fluid separation module having a bundle of hollow fiber membranes positioned in a cylindrical shell and extending through a tube sheet positioned in an enlarged end portion of the shell, the enlarged end portion of the shell having therein an inlet opening for the admission of a fluid mixture into the shell, comprising
   (a) a first sleeve attached to the tube sheet in a position enclosing the bundle of fibers, said first sleeve having a distal end spaced from the tube sheet,
   (b) a second sleeve positioned to enclose the fiber bundle, said second sleeve being spaced from the tube sheet to leave a first annular opening for the passage of the fluid mixture in a radial direction toward the first sleeve, said second sleeve surrounding the distal end of the first sleeve and having a diameter greater than the diameter of the first sleeve to provide a second annular opening for flow of the fluid mixture in an axial direction therebetween,
   (c) means securing the first and second sleeves together at spaced points therearound to hold the second sleeve in a position concentric with the first sleeve,
   (d) a third sleeve having a diameter substantially equal to the diameter of the first sleeve and being spaced from the first sleeve to provide a third annular opening therebetween,
   (e) means for securing the second sleeve to the third sleeve, and
   (f) a fourth sleeve in the form of a porous fabric, said sleeve extending from the first sleeve to the third sleeve to cover the third annular opening, said fourth sleeve having a diameter less than the diameter of the second sleeve to hold the hollow fiber membranes out of contact with said second sleeve.
2. The apparatus of claim 1 wherein the sleeves are cylindrical and said fourth sleeve is inside the first and third sleeves.
3. The apparatus of claim 2 wherein one end of said fourth sleeve is embedded in the tube sheet.
4. The apparatus of claim 3 wherein the fabric is in the form of a mesh.
5. The apparatus of claim 4 wherein the mesh is made from a polymeric material.
6. The apparatus of claim 4 wherein the mesh is made from a metal.

* * * * *